United States Patent
Sawamoto

(10) Patent No.: US 6,873,899 B2
(45) Date of Patent: Mar. 29, 2005

(54) DRIVE CONTROL APPARATUS FOR VEHICLE

(75) Inventor: Kiichiro Sawamoto, Kuki (JP)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 10/809,219

(22) Filed: Mar. 24, 2004

(65) Prior Publication Data

US 2004/0249548 A1 Dec. 9, 2004

(30) Foreign Application Priority Data

Apr. 2, 2003 (JP) ........................................ 2003-099122

(51) Int. Cl.⁷ ................................................ B60T 7/12
(52) U.S. Cl. .......................... 701/96; 701/93; 701/300; 180/167; 342/70; 340/903; 340/435
(58) Field of Search ............................. 701/93, 96, 205, 701/300, 301; 342/29, 73, 70, 104, 109; 340/902, 903, 435, 436, 444, 465, 467; 180/167, 168, 169, 170, 271, 282

(56) References Cited

U.S. PATENT DOCUMENTS

| | | | |
|---|---|---|---|
| 6,311,119 B2 * | 10/2001 | Sawamoto et al. ............ | 701/96 |
| 6,408,241 B1 * | 6/2002 | Sielagoski et al. ............ | 701/96 |
| 6,496,770 B2 * | 12/2002 | Winner et al. ................. | 701/96 |
| 6,580,996 B1 * | 6/2003 | Friedrich ....................... | 701/96 |
| 6,732,024 B2 * | 5/2004 | Wilhelm Rekow et al. ... | 701/26 |
| 6,795,765 B2 * | 9/2004 | Miyahara ....................... | 701/96 |

FOREIGN PATENT DOCUMENTS

JP 2001-063401 3/2001

* cited by examiner

Primary Examiner—Richard M. Camby
(74) Attorney, Agent, or Firm—O'Melveny & Myers LLP

(57) ABSTRACT

A drive control apparatus for a vehicle includes an object detecting device for detecting objects in front of the vehicle, a running track calculation device, a preceding vehicle detecting device, a vehicle control device for controlling a speed of the vehicle so that the vehicle runs following the preceding vehicle, a preceding vehicle information output device, and a control mode selecting device for selecting one of a first control mode in which the vehicle control device is allowed to execute a follow-up control operation, and the preceding vehicle information output device is allowed to output information about the preceding vehicle, and a second control mode in which the vehicle control device is not allowed to execute a follow-up control operation, and the preceding vehicle information output device is allowed to output information about the preceding vehicle.

8 Claims, 2 Drawing Sheets

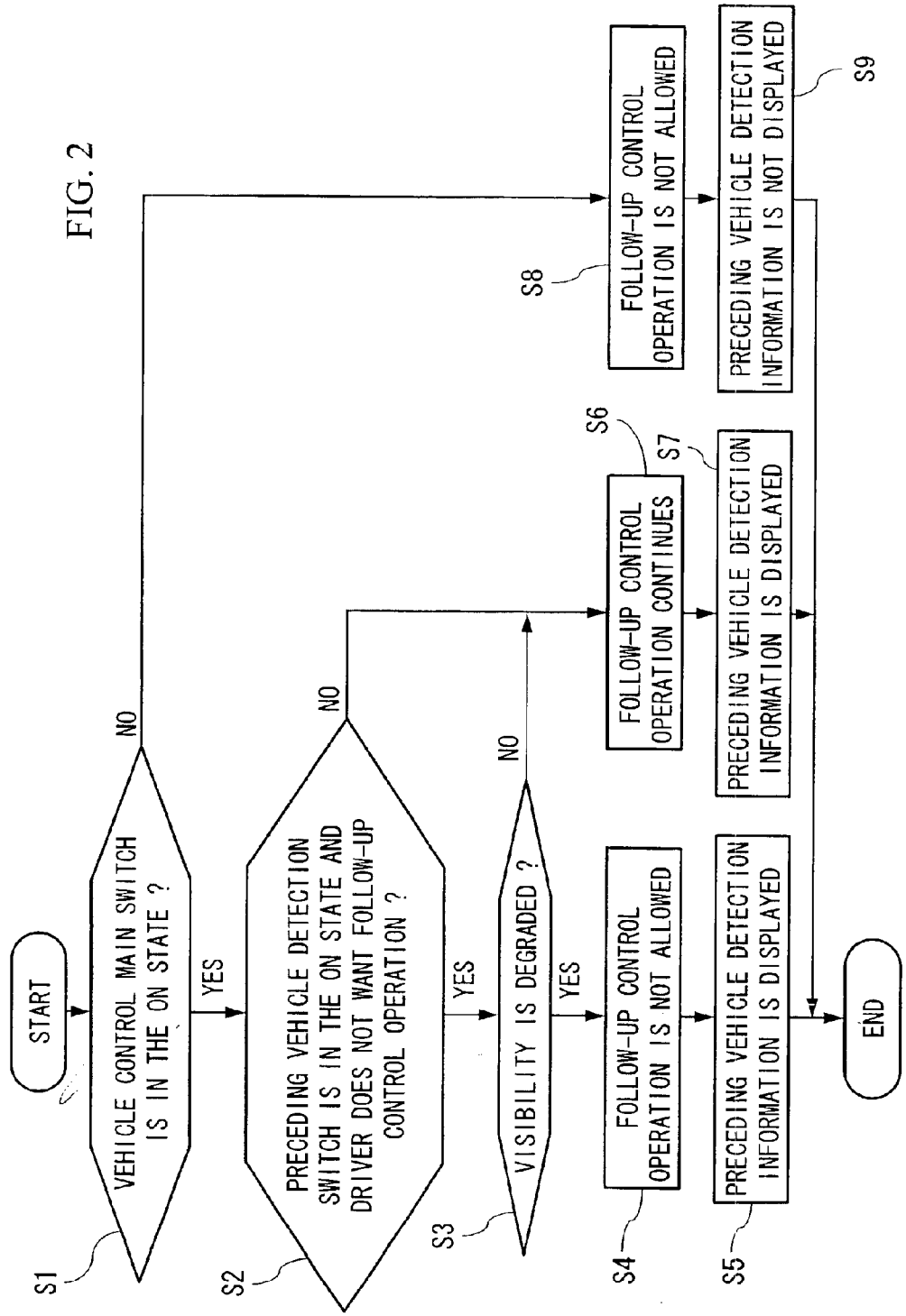

DRIVE CONTROL APPARATUS FOR VEHICLE

BACKGROUND OF THE INVENTION

1. Field of the Invention

The present invention relates to a drive control apparatus for a vehicle, employed for following another vehicle which is preceding ahead.

Priority is claimed on Japanese Patent Application No. 2003-99122, filed Apr. 2, 2003, the content of which is incorporated herein by reference.

2. Description of Related Art

A drive control apparatus for a vehicle (a first vehicle) is known in which a preceding vehicle (a second vehicle which runs ahead of the first vehicle) which the first vehicle should follow is detected by a preceding vehicle detecting means such as a radar, an image sensor, etc., a distance to the preceding vehicle and a relative velocity with respect to the preceding vehicle are calculated, and, depending on such information, an inter-vehicle distance between the first vehicle and the preceding vehicle is controlled so that interference therebetween is avoided. In such a drive control apparatus, when the vehicle is placed in a control state, the preceding vehicle is detected, a signal indicating the preceding vehicle is sent to the driver of the first vehicle, and a control operation of the inter-vehicle distance between the first vehicle and the preceding vehicle is executed. On the other hand, when the vehicle is switched into a non-control state, the control operation of the inter-vehicle distance is suspended, and sending of the signal indicating the preceding vehicle is also suspended (see, for example, Japanese Unexamined Patent Application, First Publication No. 2001-63401).

As described above, in the known technological means, because the drive control apparatus for a vehicle executes the control operation of the inter-vehicle distance with respect to the preceding vehicle while sending information indicating detection of the preceding vehicle to the driver of the first vehicle, which is following the preceding vehicle, and the driver of the first vehicle can grasp the positional relationship between the preceding vehicle and the first vehicle during the control operation of the inter-vehicle distance, the driver entrusts driving of the vehicle to the drive control apparatus at ease under normal conditions; however, due to bad road conditions, a problem may be encountered when the driver cannot visually understand the environment.

More specifically, when, for example, the vehicle in which the drive control apparatus is installed runs on a snowy road or runs in falling snow, visibility to the driver in the vehicle following the preceding vehicle may be significantly reduced due to snow flung up from the road or by falling snow. On the other hand, because a radio wave type radar, such as a millimeter radar, has excellent environmental robustness, and the wave type radar can reliably detect a preceding vehicle even when snow as an obstacle exists between the first vehicle and the preceding vehicle, the control operation of the inter-vehicle distance with respect to the preceding vehicle can be executed.

However, because the preceding vehicle cannot be clearly seen due to reduction of visibility, the driver may suspend the control operation of the inter-vehicle distance by the drive control apparatus, and may try to manually maneuver the vehicle. In this state, even though the control operation of the inter-vehicle distance by the drive control apparatus is suspended by the driver's intention, the driver may wish to obtain information indicating existence of a preceding vehicle under such conditions of reduced visibility.

In the case of the known drive control apparatus, because the control operation of the inter-vehicle distance by the drive control apparatus must be executed in order to obtain information regarding the preceding vehicle, a problem is encountered in that the driver's intention to suspend the control operation of the inter-vehicle distance by the drive control apparatus and to manually maneuver the vehicle is incompatible with the driver's intention to obtain information regarding the preceding vehicle.

SUMMARY OF THE INVENTION

The present invention was conceived in view of the above circumstances, and an object of the present invention is to provide a drive control apparatus for a vehicle, which appropriately sends information about a preceding vehicle to a driver depending on road conditions and the driver's intention.

In order to achieve the above object, the present invention provides a drive control apparatus for a vehicle (a first vehicle), including an object detecting device for detecting objects in front of the vehicle, which is installed in the vehicle; a running track calculation device for calculating a running track along which the vehicle runs; a preceding vehicle detecting device for detecting a preceding vehicle (a second vehicle) which the first vehicle is to follow among the objects depending on signals output from the object detecting device and from the running track calculation device; a vehicle control device for controlling a speed of the vehicle so that the vehicle runs following the preceding vehicle; a preceding vehicle information output device for informing a driver of the vehicle of information about the preceding vehicle obtained by the object detecting device; and a control mode selecting device for selecting one of a first control mode in which the vehicle control device is allowed to execute a follow-up control operation, and the preceding vehicle information output device is allowed to output information about the preceding vehicle, and a second control mode in which the vehicle control device is not allowed to execute a follow-up control operation, and the preceding vehicle information output device is allowed to output information about the preceding vehicle.

According to the drive control apparatus described above, because the control mode selecting device is provided, in the first control mode, the follow-up control operation is executed by the vehicle control device while the preceding vehicle information output device outputs the information about the preceding vehicle; therefore, the driver of the first vehicle can grasp the positional relationship between the preceding vehicle and the first vehicle during the follow-up control operation. On the other hand, in the second control mode, even when the vehicle control device is not allowed to execute the follow-up control operation, the preceding vehicle information output device outputs the information about the preceding vehicle; therefore, the driver of the first vehicle can grasp the positional relationship between the preceding vehicle and the first vehicle when the follow-up control operation by the vehicle control device is not executed.

The above drive control apparatus may further include a visibility determining device for determining a degree of forward visibility of the vehicle, and the control mode selecting device may select the second control mode when the degree of visibility determined by the visibility determining device is less than or equal to a predetermined threshold.

According to the drive control apparatus described above, when it is determined that the degree of visibility determined by the visibility determining device is less than or equal to a predetermined threshold, it is determined that the driver of the vehicle cannot perceive the preceding vehicle even when the preceding vehicle detecting device detects the preceding vehicle, and the second control mode, in which the vehicle control device is not allowed to execute the follow-up control operation, and the preceding vehicle information output device is allowed to output information about the preceding vehicle, is selected; therefore, the driver of the first vehicle can at least grasp the positional relationship between the preceding vehicle and the first vehicle.

The above drive control apparatus may further include a visibility determining device for determining a degree of forward visibility of the vehicle, and the control mode selecting device may select the first control mode when the degree of visibility determined by the visibility determining device is greater than a predetermined threshold.

According to the drive control apparatus described above, when it is determined that the degree of visibility determined by the visibility determining device is greater than a predetermined threshold, it is determined that the preceding vehicle detecting device and the driver of the vehicle can perceive the preceding vehicle, and the first control mode, in which the vehicle control device is allowed to execute a follow-up control operation, and the preceding vehicle information output device is allowed to output information about the preceding vehicle, is selected; therefore, the follow-up control operation by the vehicle control device is normally executed while allowing the driver of the vehicle to grasp the positional relationship between the preceding vehicle and the first vehicle.

The above drive control apparatus may further include a warning device for sending a warning to the driver when the degree of visibility determined by the visibility determining device is reduced.

According to the drive control apparatus described above, when the degree of visibility determined by the visibility determining device is reduced, a warning is sent to the driver so as to allow the driver to take appropriate actions.

In the above drive control apparatus, the visibility determining device may include an image capturing device for capturing image of a forward view of the vehicle.

According to the drive control apparatus described above, because an image capturing device is employed as the visibility determining device, the degree of visibility determined by the visibility determining device can be made equivalent to that perceived by the driver of the vehicle.

The above drive control apparatus may further include a switching signal sending device for outputting a switching signal by being operated by the driver, and the control mode selecting device may switch the control modes from one to the other depending on the switching signal output from the switching signal outputting device.

According to the drive control apparatus described above, because the switching signal sending device is provided, one of the control modes can be selected in accordance with the driver's intention.

BRIEF DESCRIPTION OF THE DRAWINGS

FIG. 2 is a flowchart showing an operation for determining prohibition of a vehicle control operation.

DETAILED DESCRIPTION OF THE INVENTION

Figure 1:
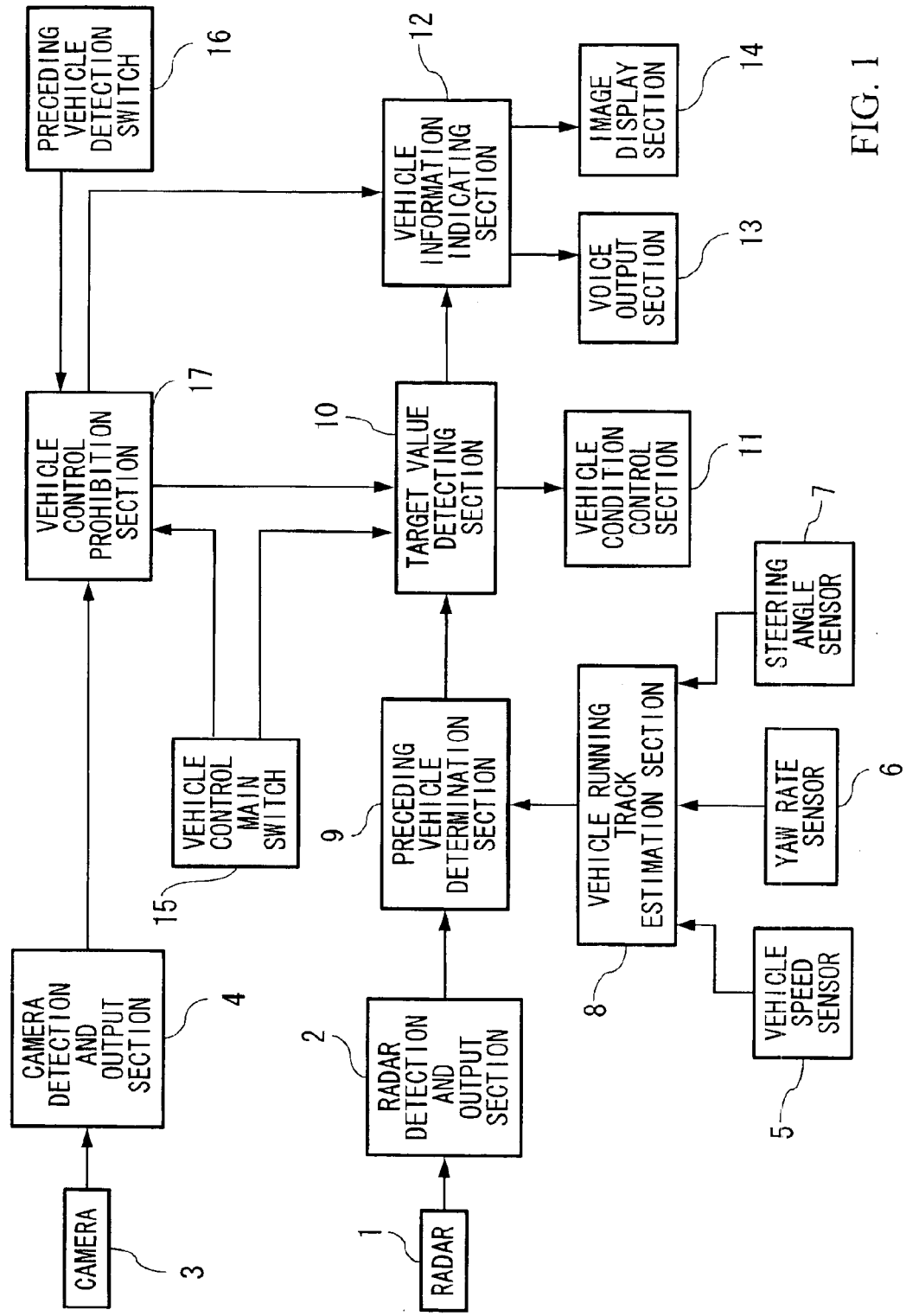
FIG. 1 is a block diagram showing constitution of an embodiment of a drive control apparatus for a vehicle according to the present invention.

An embodiment of the present invention will be explained below with reference to the appended drawings.

FIG. 1 is a block diagram showing the constitution of an embodiment of a drive control apparatus for a vehicle according to the present invention.

In FIG. 1, reference numeral 1 indicates a radar which is installed in a vehicle (a first vehicle) that is provided with the drive control apparatus for a vehicle of this embodiment. The radar 1 is mounted at a front portion of the first vehicle for sending radar waves around the first vehicle and for receiving the radar waves reflected by objects. A radar detection and output section 2 is provided on the radar 1, and detects objects in front of the first vehicle by analyzing the reflected radar waves received by the radar 1.

A camera 3, which is an image capturing device, is mounted at the front portion of the first vehicle for capturing images around the first vehicle that is provided with the drive control apparatus. A camera detection and output section 4 is provided on the camera 3, and detects objects in front of the first vehicle by analyzing the images taken by the camera 3.

The drive control apparatus of this embodiment includes, as operation sections which are practically constituted by an ECU (Electric Control Unit) having a CPU (Central Processing Unit), a vehicle running track estimation section 8, a preceding vehicle determination section 9, a target value determination section 10, a vehicle condition control section 11, a vehicle information indicating section 12, and a vehicle control prohibition section 17.

The vehicle running track estimation section 8 is an operation section which calculates a running track of the first vehicle using a vehicle speed sensor 5 for calculating speed of the first vehicle, a yaw rate sensor 6 for calculating a yaw rate of the first vehicle, and steering angle sensor 7 for calculating a direction along which the first vehicle runs depending on a steered angle of a steering wheel of the first vehicle.

The preceding vehicle determination section 9 determines a preceding vehicle (a second vehicle) which the first vehicle should follow depending on the running track calculated by the vehicle running track estimation section 8 and on information about the objects in front of the first vehicle output by the radar detection and output section 2. In addition, the preceding vehicle determination section 9 acts as an operation section which calculates an object information including a distance between the detected preceding vehicle and the first vehicle, and a relative velocity therebetween.

On the other hand, the target value determination section 10 acts as an operation section which determines a target inter-vehicle distance between the preceding vehicle and the first vehicle, a target vehicle speed, and an acceleration and deceleration gain, which indicates a degree of acceleration or deceleration of the first vehicle, depending on an inter-vehicle distance which is set by the driver of the first vehicle.

The vehicle condition control section 11 performs controlling of various control elements of the first vehicle, such as depressing and releasing of an accelerator pedal and a brake pedal, depending on the target inter-vehicle distance with respect to the preceding vehicle, the target vehicle speed, and the acceleration and deceleration gain, which indicates a degree of acceleration or deceleration of the first vehicle, determined by the target value determination section 10.

On the other hand, the drive control apparatus of this embodiment includes, as indication means for the occupants in the first vehicle, a voice output section 13 having a voice indication device such as a speaker, an image display section 14 having a display device such as a CRT (Cathode Ray Tube) display or a liquid crystal display. The drive control apparatus sends (or indicates) information about the preceding vehicle determined by the target value determination section 10, as a preceding vehicle detection information, to the driver or occupants of the first vehicle using the voice output section 13 and the image display section 14 via the vehicle information indicating section 12.

A vehicle control main switch 15 is provided for executing or suspending a follow-up control operation which is executed by the target value determination section 10 and the vehicle condition control section 11, and for performing or suspending displaying of the preceding vehicle detection information by the vehicle information indicating section 12. When the driver of the first vehicle places the vehicle control main switch 15 in the ON state, it is determined that the driver wants execution of the follow-up control operation and display of the preceding vehicle detection information by the drive control apparatus, and when the driver of the first vehicle places the vehicle control main switch 15 in the OFF state, it is determined that the driver does not want execution of the follow-up control operation and display of the preceding vehicle detection information by the drive control apparatus.

On the other hand, a preceding vehicle detection switch 16 is provided for executing or suspending the follow-up control operation which is executed by the target value determination section 10 and the vehicle condition control section 11, while display of the preceding vehicle detection information is performed by the vehicle information indicating section 12. When the preceding vehicle detection switch 16 is placed in the ON state, it is determined that the driver wants display of the preceding vehicle detection information by the vehicle information indicating section 12 because a forward visibility of the first vehicle is reduced, but the driver thinks that the follow-up control operation may be suspended, and when the preceding vehicle detection switch 16 is placed in the OFF state, it is determined that the driver wants the follow-up control operation.

Moreover, the vehicle control prohibition section 17 acts as an operation section which grasps the driver's intention depending on the states of the vehicle control main switch 15 and the preceding vehicle detection switch 16, and which, at the same time, practically controls the vehicle information indicating section 12 so as to display or not to display the preceding vehicle detection information, and controls the target value determination section 10 and the vehicle condition control section 11 so as to execute or not to execute the follow-up control operation. More specifically, the vehicle control prohibition section 17 selects one of a first control mode in which the target value determination section 10 and the vehicle condition control section 11 are allowed to execute the follow-up control operation while the vehicle information indicating section 12 is allowed to send the preceding vehicle detection information to the voice output section 13 as well as to the image display section 14, and a second control mode in which the target value determination section 10 and the vehicle condition control section 11 are not allowed to execute the follow-up control operation while the vehicle information indicating section 12 is allowed to send the preceding vehicle detection information to the voice output section 13 as well as to the image display section 14.

In the drive control apparatus of this embodiment constructed as described above, when the follow-up control operation is executed, the preceding vehicle determination section 9 detects a preceding vehicle, which the first vehicle follows, among the objects detected by the radar 1 and the radar detection and output section 2 depending on the vehicle running track calculated by the vehicle running track estimation section 8 and on the information about the objects in front of the first vehicle output from the radar detection and output section 2, and the object information, which includes the inter-vehicle distance between the detected preceding vehicle and the first vehicle and the relative velocity therebetween, is calculated as well.

Moreover, the target determination section 10 determines the target inter-vehicle distance with respect to the preceding vehicle which the first vehicle follows, the target vehicle speed, and the acceleration and deceleration gain, which indicates a degree of acceleration or deceleration of the first vehicle, depending on an inter-vehicle distance which is set by the driver of the first vehicle. The vehicle condition control section 11 performs controlling of various control elements of the first vehicle, such as depressing and releasing of an accelerator pedal and a brake pedal, depending on the target inter-vehicle distance with respect to the preceding vehicle, the target vehicle speed, and the acceleration and deceleration gain, which indicates a degree of acceleration or deceleration of the first vehicle, determined by the target value determination section 10. The information about the preceding vehicle determined by the target value determination section 10 is sent to the voice output section 13 as well as to the image display section 14, as a preceding vehicle detection information, via the vehicle information indicating section 12, and is thus notified to the driver.

Next, the operation for determining prohibition of the vehicle control operation, which is performed by the vehicle control prohibition section 17 in order to appropriately send the information about the preceding vehicle depending on the road conditions and the driver's intention, will be explained below with reference to the appended drawings.

FIG. 2 is a flowchart showing the operation of the vehicle control prohibition section 17 in the drive control apparatus of this embodiment.

In FIG. 2, it is determined by the vehicle control prohibition section 17 whether the vehicle control main switch 15 is placed in the ON state (step S1).

When it is determined in step S1 that the vehicle control main switch 15 is placed in the ON state (when the result of the determination in step S1 is "YES"), then, it is determined whether the preceding vehicle detection switch 16 is placed in the ON state, i.e., whether the driver of the first vehicle thinks that the follow-up control operation may be suspended as necessary depending on the environmental conditions around the first vehicle (step S2).

When it is determined in step S2 that the preceding vehicle detection switch 16 is placed in the ON state by the driver, i.e., when it is determined that the driver thinks that the follow-up control operation may be suspended (when the result of the determination in step S2 is "YES"), then, it is determined by the vehicle control prohibition section 17, depending on the signal output from the camera detection and output section 4 which is determined based on the images taken by the camera 3, whether the forward visibility of the first vehicle has been reduced (step S3).

When it is determined in step S3 that the forward visibility of the first vehicle has been reduced (when the result of the determination in step S3 is "YES"), the vehicle control prohibition section 17 does not allow the target determination section 10 and the vehicle condition control section 11 to execute the follow-up control operation (step S4) while allowing the vehicle information indicating section 12 to send the preceding vehicle detection information to the voice output section 13 as well as to the image display section 14 (step S5), and then the operation for determining prohibition of the follow-up control operation is terminated.

In contrast, when it is determined in step S2 that the preceding vehicle detection switch 16 is placed in the OFF state by the driver, i.e., when it is determined that the driver wants execution of the follow-up control operation (when the result of the determination in step S2 is "NO"), or when it is determined in step S3 that the forward visibility of the first vehicle is not reduced (when the result of the determination in step S3 is "NO"), the vehicle control prohibition section 17 allows the target determination section 10 and the vehicle condition control section 11 to execute the follow-up control operation (step S6) while also allowing the vehicle information indicating section 12 to send the preceding vehicle detection information to the voice output section 13 as well as to the image display section 14 (step S7), and then the operation for determining prohibition of the follow-up control operation is terminated.

When it is determined in step S1 that the vehicle control main switch 15 is placed in the OFF state (when the result of the determination in step S1 is "NO"), because the follow-up control operation does not have to be executed, and the driver does not need the information about the preceding vehicle (the preceding vehicle detection information), the vehicle control prohibition section 17 does not allow the target determination section 10 and the vehicle condition control section 11 to execute the follow-up control operation (step S8) while not allowing the vehicle information indicating section 12 to send the preceding vehicle detection information to the voice output section 13 as well as to the image display section 14 (step S9), and then the operation for determining prohibition of the follow-up control operation is terminated.

Accordingly, when it is determined in step S1 that the vehicle control main switch 15 is placed in the ON state, the follow-up control operation and display of the preceding vehicle detection information are performed depending on the environmental conditions around the first vehicle; however, when it is determined in step S1 that the vehicle control main switch 15 is placed in the OFF state, the drive control apparatus performs nothing because it is determined that the driver does not want execution of the follow-up control operation and display of the preceding vehicle detection information.

In contrast, when the vehicle control main switch 15 is placed in the ON state, i.e., when it is determined that the driver wants execution of the follow-up control operation and display of the preceding vehicle detection information, and it is determined in step S2 that the preceding vehicle detection switch 16 is placed in the ON state, i.e., when it is determined that the driver does not think execution of the follow-up control operation is necessary due to the environmental conditions around the first vehicle, it is determined whether or not the driver wants to manually maneuver the first vehicle without relying upon the follow-up control operation by determining in step S3 whether the visibility has been reduced.

When it is determined that the driver wants to manually maneuver the first vehicle without relying upon the follow-up control operation due to the environmental conditions around the first vehicle such as reduction of visibility, the drive control apparatus suspends the follow-up control operation, but continues to provide information as an aid for the driver by continuously displaying the preceding vehicle detection information.

However, when it is determined in step S3 that the driver thinks that the follow-up control operation may be executed for maneuvering the first vehicle due to the environmental conditions around the first vehicle such as good visibility, or when it is determined in step S2 that the preceding vehicle detection switch 16 is placed in the OFF state, i.e., when it is determined that the driver wants execution of the follow-up control operation and display of the preceding vehicle detection information, the drive control apparatus executes the follow-up control operation by which the inter-vehicle distance with respect to the preceding vehicle is maintained normally, and the drive control apparatus also performs display of the preceding vehicle detection information.

The determination whether or not visibility is good in step S4 is performed such that a detectable distance is measured on partitioning lines of the road by the camera 3 and the camera detection and output section 4, and it is determined that visibility has been reduced when the detectable distance is less than or equal to a predetermined threshold.

Alternatively, the determination whether or not visibility is good may be performed such that it is determined that visibility has been reduced when a preceding vehicle cannot be detected by the camera 3 and the camera detection and output section 4 even though the preceding vehicle is detected by the radar 1 and the radar detection and output section 2. In this case, it is determined that visibility has been reduced when a distance, at which a preceding vehicle cannot be detected by the camera 3 and the camera detection and output section 4 even though the preceding vehicle is detected by the radar 1 and the radar detection and output section 2, is less than or equal to a predetermined threshold.

In the operations in steps S1 through S9, it is determined whether the preceding vehicle detection switch 16 is placed in the ON state in step 2, i.e., it is determined what the driver of the first vehicle thinks about the necessity of the follow-up control operation depending on the environmental conditions around the first vehicle, and then in step S3, it is determined whether the visibility has been reduced; however, in contrast, the determination of whether the visibility has been reduced may be performed first, and when it is determined that the visibility has been reduced, a warning indicating reduction of visibility may be sent to the driver, and then it may be determined whether the driver turns on the preceding vehicle detection switch 16 in response to the warning.

In the above embodiment, it is determined whether the follow-up control operation should be executed while displaying the preceding vehicle detection information solely depending on whether or not the visibility has been reduced; however, alternatively, a camera for taking a picture of the present expression of the driver and a means for estimating psychological load of the driver based on the driver's expression may be provided, and when it is determined that the visibility has been reduced below a predetermined level and when it is determined that the driver's psychological load exceeds a predetermined level, the drive control apparatus may continue to provide information as an aid for the driver by continuously displaying the preceding vehicle detection information while suspending the follow-up control operation.

Moreover, the camera 3, or the camera for taking a picture of the present expression of the driver as mentioned above, may be of any type as long as it is an image capturing device, such as an image sensor, which is capable of capturing images.

As explained above, the drive control apparatus of the present embodiment includes the camera 3 and the camera detection and output section 4 for measuring visibility, and determines the degree of visibility viewed from the driver of the first vehicle. In addition, when it is determined that the driver wants to manually maneuver the first vehicle due to the environmental conditions such as reduction of visibility, the drive control apparatus continues to provide information as an aid for the driver by continuously displaying the preceding vehicle detection information while suspending the follow-up control operation.

Such a control operation is executed when the vehicle control main switch 15 is placed in the ON state, which means that the driver wants execution of the follow-up control operation and display of the preceding vehicle detection information, but the preceding vehicle detection switch 16 is placed in the ON state, which means that the driver may not need execution of the follow-up control operation depending on the environmental conditions around the first vehicle. In contrast, when it is determined that the driver thinks that the follow-up control operation may be executed for maneuvering the first vehicle due to the environmental conditions around the first vehicle such as good visibility, or when the preceding vehicle detection switch 16 is placed in the OFF state, which means that the driver wants execution of the follow-up control operation and display of the preceding vehicle detection information, the drive control apparatus executes the follow-up control operation by which the inter-vehicle distance with respect to the preceding vehicle is maintained normally, and the drive control apparatus also performs display of the preceding vehicle detection information.

Accordingly, when the visibility around the first vehicle has been reduced, and the driver wants to suspend the follow-up control operation by the drive control apparatus and to manually maneuver the first vehicle, the follow-up control operation by the drive control apparatus can be suspended in accordance with the driver's intention; however, the preceding vehicle detection information is continuously sent to the driver even when the follow-up control operation by the drive control apparatus is suspended; therefore, the driver can manually and safely drive the first vehicle while feeling a sense of security due to the preceding vehicle detection information.

Conventionally, the radar is not needed when the follow-up control operation is not executed by the drive control apparatus; however, in the above embodiment, the radar is used even when the follow-up control operation is not executed by the drive control apparatus; therefore, a cost-to-effect rate is increased.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Advantageous Effects Obtainable by the Invention

As explained above, according to the drive control apparatus of the present invention, because the control mode selecting device is provided, in the first control mode, the follow-up control operation is executed by the vehicle control device while the preceding vehicle information output device outputs the information about the preceding vehicle; therefore, the driver of the first vehicle can grasp the positional relationship between the preceding vehicle and the first vehicle during the follow-up control operation. On the other hand, in the second control mode, even when the vehicle control device is not allowed to execute the follow-up control operation, the preceding vehicle information output device outputs the information about the preceding vehicle; therefore, the driver of the first vehicle can grasp the positional relationship between the preceding vehicle and the first vehicle when the follow-up control operation by the vehicle control device is not executed.

Accordingly, the driver can select either a state in which the driver allows the drive control apparatus to execute the follow-up control operation while grasping the positional relationship between the preceding vehicle and the first vehicle based on the information about the preceding vehicle, or a state in which the driver manually drives the first vehicle. More specifically, when the driver does not feel uneasiness about execution of the follow-up control operation by the drive control apparatus, the driver may entirely rely upon the drive control apparatus, and on the other hand, when the driver wants to suspend the follow-up control operation by the drive control apparatus and to manually maneuver the first vehicle, the driver can manually and safely drive the first vehicle while feeling a sense of security due to the information about the preceding vehicle.

According to another drive control apparatus of the present invention, when it is determined that the degree of visibility determined by the visibility determining device is less than or equal to a predetermined threshold, the second control mode is selected, and the driver of the first vehicle can at least grasp the positional relationship between the preceding vehicle and the first vehicle, and on the other hand, when it is determined that the degree of visibility determined by the visibility determining device is greater than a predetermined threshold, the first control mode is selected, and the follow-up control operation by the drive control apparatus can be normally executed while allowing the driver to grasp the positional relationship between the preceding vehicle and the first vehicle.

Accordingly, because the driver's intention is appropriately grasped by determining whether the driver wants to suspend the follow-up control operation and to manually drive the first vehicle due to reduction of visibility, the follow-up control operation can be executed by the drive control apparatus, and the information about the preceding vehicle can be output by the preceding vehicle information output device, in accordance with the driver's intention.

According to another drive control apparatus of the present invention, when the degree of visibility is reduced, a warning is sent to the driver so as to allow the driver to take appropriate actions, and the control mode can be switched from one to the other based on the driver's intention by operating the switching signal sending device.

Accordingly, the driver's intention is firmly grasped by the signal output from the switching signal sending device; therefore, the follow-up control operation can be executed by the drive control apparatus, and the information about the preceding vehicle can be output by the preceding vehicle information output device, in accordance with the driver's intention.

According to another drive control apparatus of the present invention, because an image capturing device is employed as the visibility determining device, the degree of visibility determined by the visibility determining device can be made equivalent to that perceived by the driver of the first vehicle.

Accordingly, because the visibility perceived by the driver is reproduced with complete fidelity, the follow-up control operation can be executed by the drive control apparatus, and the information about the preceding vehicle can be output by the preceding vehicle information output device, in accordance with the driver's intention.

What is claimed is:

1. A drive control apparatus for a vehicle comprising:
   an object detecting device for detecting objects in front of the vehicle, which is installed in the vehicle;
   a running track calculation device for calculating a running track along which the vehicle runs;
   a preceding vehicle detecting device for detecting a preceding vehicle which the vehicle is to follow among the objects depending on signals output from the object detecting device and from the running track calculation device;
   a vehicle control device for controlling a speed of the vehicle so that the vehicle runs following the preceding vehicle;
   a preceding vehicle information output device for informing a driver of the vehicle of information about the preceding vehicle obtained by the object detecting device; and
   a control mode selecting device for selecting one of a first control mode in which the vehicle control device is allowed to execute a follow-up control operation, and the preceding vehicle information output device is allowed to output information about the preceding vehicle, and a second control mode in which the vehicle control device is not allowed to execute a follow-up control operation, and the preceding vehicle information output device is allowed to output information about the preceding vehicle.

2. A drive control apparatus according to claim 1, further comprising a visibility determining device for determining a degree of forward visibility of the vehicle;
   wherein the control mode selecting device selects the second control mode when the degree of visibility determined by the visibility determining device is less than or equal to a predetermined threshold.

3. A drive control apparatus according to claim 1, further comprising a visibility determining device for determining a degree of forward visibility of the vehicle;
   wherein the control mode selecting device selects the first control mode when the degree of visibility determined by the visibility determining device is greater than a predetermined threshold.

4. A drive control apparatus according to claim 2, further comprising a warning device for sending a warning to the driver when the degree of visibility determined by the visibility determining device is reduced.

5. A drive control apparatus according to claim 3, further comprising a warning device for sending a warning to the driver when the degree of visibility determined by the visibility determining device is reduced.

6. A drive control apparatus according to claim 2, wherein the visibility determining device comprises an image capturing device for capturing image of a forward view of the vehicle.

7. A drive control apparatus according to claim 3, wherein the visibility determining device comprises an image capturing device for capturing image of a forward view of the vehicle.

8. A drive control apparatus according to claim 1, further comprising a switching signal sending device for outputting a switching signal by being operated by the driver;
   wherein the control mode selecting device switches the control modes from one to the other depending on the switching signal output from the switching signal outputting device.

* * * * *